(12) United States Patent
Kaneko et al.

(10) Patent No.: US 10,103,388 B2
(45) Date of Patent: Oct. 16, 2018

(54) METHOD FOR PRODUCING FINE CATALYST PARTICLE AND FUEL CELL COMPRISING FINE CATALYST PARTICLE PRODUCED BY THE PRODUCTION METHOD

(71) Applicant: TOYOTA JIDOSHA KABUSHIKI KAISHA, Toyota-shi, Aichi-ken (JP)

(72) Inventors: Keiichi Kaneko, Mishima (JP); Tsugio Fujisawa, Susono (JP); Noriyuki Kitao, Shizuoka-ken (JP); Makoto Adachi, Numazu (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 358 days.

(21) Appl. No.: 14/890,181

(22) PCT Filed: May 13, 2013

(86) PCT No.: PCT/JP2013/063313
§ 371 (c)(1),
(2) Date: Nov. 10, 2015

(87) PCT Pub. No.: WO2014/184850
PCT Pub. Date: Nov. 20, 2014

(65) Prior Publication Data
US 2016/0079607 A1   Mar. 17, 2016

(51) Int. Cl.
*H01M 4/92* (2006.01)
*H01M 4/88* (2006.01)
(Continued)

(52) U.S. Cl.
CPC ......... *H01M 4/925* (2013.01); *H01M 4/8657* (2013.01); *H01M 4/88* (2013.01);
(Continued)

(58) Field of Classification Search
None
See application file for complete search history.

(56) References Cited

U.S. PATENT DOCUMENTS

2007/0031722 A1 * 2/2007 Adzic ............... H01M 4/8657
429/424
2010/0099012 A1   4/2010 Adzic
(Continued)

FOREIGN PATENT DOCUMENTS

| CN | 102844465 A | 12/2012 |
|---|---|---|
| DE | 112010005593 T5 | 3/2013 |

(Continued)

OTHER PUBLICATIONS

Minoru Inaba, et al., "Effect of Core Size on Activity and Durability of Pt Core-Shell Catalysts for PEFCs", ECS Trans. 2010, vol. 33, Issue 1, pp. 231-238. doi: 10.1149/1.3484520.
(Continued)

*Primary Examiner* — Maria Laios
*Assistant Examiner* — Robert S Carrico
(74) *Attorney, Agent, or Firm* — Hunton Andrews Kurth LLP

(57) ABSTRACT

Disclosed is a method for producing a fine catalyst particle comprising a palladium-containing particle and a platinum outermost layer covering the palladium-containing particle, wherein a first composite body containing palladium and platinum is formed by mixing the palladium-containing particle with a first solution in which a platinum compound is dissolved, and then covering at least part of a surface of the palladium-containing particle with platinum; wherein a second composite body containing palladium, platinum and copper is formed by mixing the first composite body with a second solution in which a copper compound is dissolved, and then covering at least part of a surface of the first composite body with copper using copper underpotential
(Continued)

deposition; and wherein the copper in the second composite body is substituted with platinum derived from a third solution in which a platinum compound is dissolved.

4 Claims, 7 Drawing Sheets

(51) Int. Cl.
   *H01M 4/86*    (2006.01)
   *H01M 4/90*    (2006.01)
   *H01M 8/1018*  (2016.01)

(52) U.S. Cl.
   CPC ....... *H01M 4/9041* (2013.01); *H01M 4/9075* (2013.01); *H01M 4/921* (2013.01); *H01M 4/881* (2013.01); *H01M 4/8807* (2013.01); *H01M 4/8828* (2013.01); *H01M 2008/1095* (2013.01)

(56) References Cited

U.S. PATENT DOCUMENTS

| 2010/0197490 | A1 | 8/2010 | Adzic et al. |
| 2012/0309615 | A1 | 12/2012 | Shao et al. |
| 2012/0329642 | A1* | 12/2012 | Shao ............... H01M 4/90 502/177 |
| 2013/0022899 | A1 | 1/2013 | Arai et al. |
| 2013/0059219 | A1 | 3/2013 | Hiroko et al. |

FOREIGN PATENT DOCUMENTS

| DE | 112010005260 T5 | 5/2013 |
| EP | 2557203 A1 | 2/2013 |
| JP | 2012-005969 A | 1/2012 |
| JP | 2012-102345 A | 5/2012 |
| WO | 2011/115012 A1 | 9/2011 |
| WO | 2012/115624 A1 | 8/2012 |

OTHER PUBLICATIONS

J. Greeley, et al. "Electrochemical dissolution of surface alloys in acids: Thermodynamic trends from first-principles calculations", Science Direct, Electrochimica Acta 52 (2007), pp. 5829-5836.

J. Zhang, et al., "Platinum monolayer on nonnoble metal-noble metal core-shell Nanoparticle electrocatalysts for O2 reduction", The Journal of Physical Chemistry B, Published on Web Nov. 11, 2005, vol. 109, No. 48, pp. 22701-22704.

Takashi Ohkawa, et al., "ORR activity and durability of Pd core/Pt shell structured catalyst", The 53rd Battery Symposium in Japan, Nov. 14-16, 2012, Fukuoka, 3 pages.

* cited by examiner

US 10,103,388 B2

METHOD FOR PRODUCING FINE CATALYST PARTICLE AND FUEL CELL COMPRISING FINE CATALYST PARTICLE PRODUCED BY THE PRODUCTION METHOD

CROSS-REFERENCE TO RELATED APPLICATION

This is a national phase application based on the PCT International Patent Application No. PCT/JP2013/063313 filed May 13, 2013, the entire contents of which are incorporated herein by reference.

TECHNICAL FIELD

The present invention relates to a method for producing a fine catalyst particle which is configured to show high activity from the beginning of the production, and a fuel cell comprising a fine catalyst particle produced by the production method.

BACKGROUND ART

A fuel cell converts chemical energy directly into electric energy by supplying a fuel and an oxidant to two electrically-connected electrodes each and electrochemically oxidizing the fuel. Unlike thermal power generation, a fuel cell is not limited by the Carnot cycle; therefore, it shows high energy conversion efficiency. A fuel cell is generally constituted of a stack of single cells, each of which has a membrane electrode assembly as the basic structure, in which an electrolyte membrane is sandwiched between a pair of electrodes.

Supported platinum and platinum alloy materials have been used as the catalyst of the anode and cathode electrodes of a fuel cell. However, platinum in an amount that is required of today's electrode catalyst, is still expensive to realize commercial mass production of fuel cells. Accordingly, studies to reduce the amount of platinum contained in the cathode and anode of a fuel cell by combining platinum with a less expensive metal, have been carried out.

In recent years, as a catalyst for electrodes of fuel cells, core-shell fine catalyst particles have attracted attention (hereinafter may be referred to as core-shell catalyst). From the viewpoint of increasing the coverage of a core with a shell, generally in the area of methods for producing core-shell catalyst, such a method that a monatomic layer is formed in advance on a core surface by an under potential deposition method such as Cu under potential deposition (hereinafter may be referred to as Cu-UPD) and then the monatomic layer is substituted with a shell, is known.

As a technique using Cu-UPD, a method for forming a catalyst material is disclosed in Patent Literature 1, in which a catalyst material containing a platinum atomic layer is produced by substituting a copper atomic layer with a platinum atomic layer in the presence of a surfactant.

CITATION LIST

Patent Literature 1: International Publication No. WO2012/115624

SUMMARY OF INVENTION

Technical Problem

However, as a result of research, the inventors of the present invention have found that a core is not sufficiently covered with a platinum atomic layer by the method as disclosed in Patent Literature 1, that is, by the method of covering the core with a copper atomic layer by Cu-UPD and then substituting the copper atomic layer with a platinum atomic layer. Accordingly, the thus-obtained core-shell catalyst does not have high activity from the beginning of the production, and there is such a problem that a long pre-conditioning interim operation is needed for high activity, that is, an operation for increasing the activity of the core-shell catalyst in advance by changing the state of the core-shell catalyst surface by applying a potential cycle, etc., is needed.

The present invention was achieved in light of the above circumstances. An object of the present invention is to provide a method for producing a fine catalyst particle which is configured to show high activity from the beginning of the production, and a fuel cell comprising a fine catalyst particle produced by the production method.

Solution to Problem

The first fine catalyst particle production method of the present invention is a method for producing a fine catalyst particle comprising a palladium-containing particle and a platinum outermost layer covering the palladium-containing particle, wherein a first composite body containing palladium and platinum is formed by mixing the palladium-containing particle with a first solution in which a platinum compound is dissolved, and then covering at least part of a surface of the palladium-containing particle with platinum; wherein a second composite body containing palladium, platinum and copper is formed by mixing the first composite body with a second solution in which a copper compound is dissolved, and then covering at least part of a surface of the first composite body with copper using copper underpotential deposition; and wherein the copper in the second composite body is substituted with platinum derived from a third solution in which a platinum compound is dissolved, by mixing the second composite body with the third solution.

The second fine catalyst particle production method of the present invention is a method for producing a fine catalyst particle comprising a palladium-containing particle and a platinum outermost layer covering the palladium-containing particle, wherein a composite body A containing palladium and copper is formed by mixing the palladium-containing particle with a second solution in which a copper compound is dissolved, and then covering at least part of a surface of the palladium-containing particle with copper using copper underpotential deposition; wherein a composite body B containing palladium and platinum is formed by mixing the composite body A with a third solution in which a platinum compound is dissolved, and then substituting the copper in the composite body A with the platinum derived from the third solution; and wherein at least part of a surface of the composite body B is covered with platinum by mixing the composite body B with a first solution in which a platinum compound is dissolved.

In the present invention, preferably, the palladium-containing particle is supported on a carrier.

In the present invention, preferably, the palladium-containing particle is subjected to an acid treatment in advance, before the first composite body or the composite body A is formed.

In the present invention, the amount of platinum atoms contained in the first solution can be 70 atm % or less, when a minimum amount of platinum atoms required to cover the palladium-containing particle with a monatomic layer of platinum is 100 atm %.

The fuel cell of the present invention is a fuel cell comprising unit cells, each of which comprises a membrane electrode assembly in which an anode electrode comprising at least an anode catalyst layer is disposed on one side of a polyelectrolyte membrane and a cathode electrode comprising at least a cathode catalyst layer is disposed on another side of the polyelectrolyte membrane, wherein a fine catalyst particle produced by the first or second production method is contained in at least any one of the anode catalyst layer and the cathode catalyst layer.

Advantageous Effects of Invention

According to the present invention, a fine catalyst particle with very high coverage can be produced by mixing the palladium-containing particle with the first solution, covering at least part of the surface of the palladium-containing particle with platinum, and then covering the rest of the palladium-containing particle surface with platinum by Cu-UPD. Also according to the present invention, the fine catalyst particle thus obtained shows high activity from the beginning of the production, so that a pre-conditioning interim operation is not needed and, as a result, the fine catalyst particle can be used for catalytic reaction just after the production.

DESCRIPTION OF EMBODIMENTS

Figure 1:
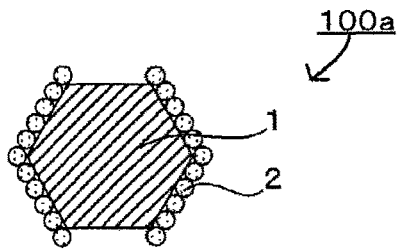
FIG. 1 is a schematic sectional view of a typical example of the first composite body of the present invention.

1. The First Method for Producing a Fine Catalyst Particle

The first fine catalyst particle production method of the present invention is a method for producing a fine catalyst particle comprising a palladium-containing particle and a platinum outermost layer covering the palladium-containing particle, wherein a first composite body containing palladium and platinum is formed by mixing the palladium-containing particle with a first solution in which a platinum compound is dissolved, and then covering at least part of a surface of the palladium-containing particle with platinum; wherein a second composite body containing palladium, platinum and copper is formed by mixing the first composite body with a second solution in which a copper compound is dissolved, and then covering at least part of a surface of the first composite body with copper using copper underpotential deposition; and wherein the copper in the second composite body is substituted with platinum derived from a third solution in which a platinum compound is dissolved, by mixing the second composite body with the third solution.

In Patent Literature 1, as a method for synthesizing a core-shell catalyst, a conventional synthesis method using Cu-UPD is disclosed, which is aimed at controlling a platinum monatomic layer that will be a shell.

However, as a result of research, the inventors of the present invention have found the following problem: especially, a conventional core-shell catalyst produced on a milligram or gram scale, in which the core contains palladium and the shell contains platinum, shows low mass activity just after the production, and the mass activity is at most about just over twice the mass activity of a platinum-supported carbon. Accordingly, the conventional core-shell catalyst has such a problem that without a potential treatment such as a rotating disk electrode (RDE) method, it cannot obtain a mass activity that is obtained by the synthesis on a microgram scale (corresponding to a mass activity which is three or more times higher than the mass activity of the platinum-supported carbon).

Also, the inventors of the present invention have found the following problem: although the catalytic activity just after the production (initial activity) is important from the viewpoint of application to fuel cells, the conventional core-shell catalyst is inherently low in catalytic activity and, moreover, needs a pre-conditioning interim operation for a very long period of time to keep the catalytic activity at a certain level or more. This is because, due to a difference in operational environment between the inside of a fuel cell and that of a liquid cell, the potential treatment inside the fuel cell is less effective than the potential treatment inside the liquid cell using RDE. The operational environment inside the fuel cell differs from the operational environment inside the liquid cell as follows, for example: the core-shell catalyst is covered with an ionomer; the catalyst layer is very thin; and the effect of convection of substance transportation is produced by rotation.

The inventors of the present invention predicted the following: the conventional core-shell catalyst produced on a milligram or higher scale using Cu-UPD has an uncompleted core-shell structure just after the production in which the shell is not uniform; therefore, when a potential treatment is carried out on the conventional core-shell catalyst, the shell covering state is changed and, as a result, the core-shell structure is finally completed. The inventors of the present invention promoted research and development with the aim of producing a fine catalyst particle which has a complete core-shell structure just after the production.

Meanwhile, as a core-shell catalyst production method, a method for directly depositing platinum on a gold particle by bringing a gold particle (core) into contact with a platinum complex solution, is known. This method can directly cover a gold particle with platinum, not through Cu-UPD.

However, in the case of the gold core, the resulting catalyst expensive as a conventional platinum-supported carbon catalyst and has no cost advantage. On page 237 in a publicly known document (M. Inaba et, al., ECS Transaction, 33(1) 231-238 (2010)), it is described that in a core-shell catalyst using a gold core, a platinum shell is dissolved to form an alloy with the gold core, and that such a dissolution of the platinum shell causes a decrease in activity when a potential cycle is applied. This is considered to be because gold is rich in mechanical flexibility such as malleability and ductility.

Also, since gold has very poor oxygen reduction activity, there is such a possible disadvantage that a loss of the platinum shell leads to a severe decrease in activity.

Conventionally, it has been considered that when a palladium-containing particle is brought into direct contact with a solution containing a platinum compound, the palladium of the palladium-containing particle surface is substituted with the platinum by ionization tendency. However, as shown in the below-described examples, the inventors of the present invention first discovered that in this case, the palladium is not substituted with the platinum, and the platinum is deposited on the palladium-containing particle surface in a system using chloroplatinate. Also, the inventors of the present invention have found that the core-shell catalyst obtained by the direct contact of the palladium-containing particle with the solution containing the platinum compound, is higher in activity and better in durability than the conventional core-shell catalyst produced using Cu-UPD.

In addition, the inventors of the present invention have found that a core-shell catalyst which is high in catalytic activity just after the synthesis and is excellent in durability, can be obtained by bringing the palladium-containing particle into direct contact with the solution containing the platinum compound to form a platinum layer, and then depositing platinum further by Cu-UPD on a part where the platinum layer is not formed. Based on these findings, they completed the present invention.

The present invention has the steps of: (1) forming the first composite body, (2) forming the second composite body, and (3) substituting copper in the second composite body with platinum. The present invention is not limited to the three steps. In addition to the three steps, the present invention can have an acid treatment step, filtering step, washing step and drying step as described below, for example.

Hereinafter, the steps (1) to (3) and other steps will be described in order.

1-1. The Step of Forming the First Composite Body

This is a step of forming the first composite body containing palladium and platinum by mixing the palladium-containing particle with the first solution in which the platinum compound is dissolved, and then covering at least part of the palladium-containing particle surface with the platinum.

In the present invention, the term "palladium-containing particle" is used as a general term for palladium particle and palladium alloy particle.

As will be described below, the outermost layer covering the palladium-containing particle contains platinum. Platinum is excellent in catalytic activity, especially in oxygen reduction reaction (ORR) activity. While the lattice constant of platinum is 3.92 Å, the lattice constant of palladium is 3.89 Å and is a value that is within a range of 5% either side of the lattice constant of platinum. Accordingly, no lattice mismatch occurs between platinum and palladium, and palladium is sufficiently covered with platinum.

In the present invention, from the viewpoint of reducing costs, it is preferable that the palladium-containing particle contains a metal material that is less expensive than platinum used for the outermost layer. It is also preferable that the palladium-containing particle contains a metal material that contributes to electrical continuity.

From the above-mentioned viewpoints, in the present invention, the palladium-containing particle is preferably a palladium particle or a particle of an alloy of palladium with a metal such as iridium, rhodium or gold. In the case of using a palladium alloy particle, the palladium alloy particle can contain only one kind of metal or two or more kinds of metals in combination with palladium.

The average particle diameter of the palladium-containing particles is not particularly limited, as long as it is equal to or less than the average particle diameter of the below-described fine catalyst particles. From the point of view that the ratio of surface area to cost per palladium-containing particle is high, the average particle diameter of the palladium-containing particles is preferably 30 nm or less, more preferably 3 to 10 nm.

In the present invention, the average particle diameter of the palladium-containing particles and the fine catalyst particles is calculated by a conventional method. An example of the method for calculating the average particle diameter of the palladium-containing particles and the fine catalyst particles is as follows. First, the particle diameter of a particle shown in a TEM image at a magnification of 400,000 to 1,000,000 times is calculated, given that the particle is spherical. Such a particle diameter calculation by TEM observation is carried out on 200 to 300 particles of the same type, and the average of these particles is deemed as the average particle diameter.

The palladium-containing particle can be supported on a carrier. Especially, from the viewpoint of imparting electroconductivity to the electrocatalyst layer of a fuel cell when the fine catalyst particle produced by the present invention is used for the electrocatalyst layer, the carrier is preferably an electroconductive material.

Concrete examples of electroconductive materials that can be used as the carrier include, for example, electroconductive carbonaceous materials including carbon particles and carbon fibers, such as Ketjen Black (product name; manufactured by: Ketjen Black International Company), Vulcan (product name; manufactured by: Cabot), Norit (product name; manufactured by: Norit), Black Pearls (product name; manufactured by: Cabot) and Acetylene black (product name; manufactured by: Chevron), and metal materials such as metal particles and metal fibers.

The carrier on which the palladium-containing particle is supported can be a previously-prepared carrier or a commercially-available carrier.

To support the palladium-containing particle on the carrier, any conventional supporting method can be used. In the case of using a palladium alloy particle, the preparation of the palladium alloy can be carried out concurrently with the supporting of the palladium alloy particle.

In this step, the palladium-containing particle is mixed with the first solution in which the platinum compound is dissolved. The embodiment of the mixing of the palladium-containing particle with the first solution is not particularly limited. For example, a powder of the palladium-containing particles itself can be mixed with the first solution; a powder of the carrier on which the palladium-containing particle is supported can be mixed with the first solution; a dispersion of the palladium-containing particles can be mixed with the first solution; or a dispersion of the carrier on which the palladium-containing particle is supported can be mixed with the first solution. That is, the palladium-containing particles can be in a solid state or in a state of being dispersed in solution. Also, it is not a matter whether the palladium-containing particle is supported on the carrier or not.

In the present invention, the platinum compound can exist as it is in "the first solution in which the platinum compound is dissolved", or platinum ions can exist therein. That is, the platinum element derived from the platinum compound is needed to be contained in the first solution. The platinum compound used herein encompasses platinum salts and platinum complexes.

As described above, the inventors of the present invention first discovered that when the palladium-containing particle is brought into direct contact with the solution in which the platinum compound is dissolved (hereinafter may be referred to as platinum compound solution), the platinum is deposited on the palladium-containing particle surface, without the substitution of the palladium with the platinum. The platinum compound solution particularly refers to a system using chloroplatinate. This finding is based on the following verification (see Reference Example 1). First, the ratio of palladium in a palladium-supported carbon used in Reference Example 1 is 15.9%. Next, when the palladium of the palladium particle surface (corresponding to about 33% of the particle) is eluted and platinum is deposited thereon (in terms of calculation, Pt: 9.47% and Pd: 10.1%), the ratio of the palladium (10.1%) to the palladium-supported carbon (90.5%) is calculated as follows: 10.1/90.5=11.2%. However, in the catalyst for fuel cells of Reference Example 1, the ratio of the palladium (13.9%) to the palladium-supported carbon (93.4%) is 13.9/93.4=14.9%. The palladium ratio in Reference Example 1 (14.9%) is closer to the palladium ratio in the raw material (palladium-supported carbon) (15.9%), rather than the value when the palladium is eluted (11.2%). From this result, it is clear that when the palladium-containing particle is immersed in the platinum compound solution, the platinum is deposited as it is on the palladium-containing particle surface, without any damage to the palladium-containing particle surface.

In addition, the inventors of the present invention have found that the fine catalyst particle obtained by such direct contact of the palladium particle with the platinum compound solution, has better mass activity, specific activity and durability compared to the conventional core-shell catalyst synthesized by Cu-UPD. That is, as is clear from the below-described comparison between Reference Example 1 and Comparative Example 1, even though the platinum in an amount that was approximately equal to the palladium particle surface was deposited, the fine catalyst particle obtained by direct contact of the palladium particle with the platinum compound solution (Reference Example 1) has better mass activity and specific activity than the conventional core-shell catalyst synthesized by Cu-UPD (Comparative Example 1), and the electrochemical surface area retention rate after a potential cycle is higher.

The reason for the difference in the electrochemical surface area retention rate is considered as follows: due to the difference in platinum deposition method, the platinum-covered area on the palladium-containing particle surface varies and results in a difference in the integrity of the fine catalyst particle thus obtained. Especially, the method for bringing the palladium-containing particle into direct contact with the platinum compound solution is considered to be a method that can preferentially deposit the platinum on the palladium-containing particle surface that is relatively unstable.

The catalysts for fuel cells of Reference Examples 1 and 2 only differ in the used platinum compound amount, and both of them contain the fine catalyst particle obtained by the direct contact of the palladium particle with the platinum compound solution. As shown in the below-described Table 1, as a result of comparing the ICP measurement results of Reference Examples 1 and 2, almost no difference is found in the ratio of the platinum and palladium on the palladium particle surface and in the coverage. From this result, the following facts are clear: in the method for bringing the palladium-containing particle into direct contact with the platinum compound solution, even if the platinum compound amount is changed, the composition of the palladium-containing particle surface is not greatly affected and has low sensitivity to the added platinum amount; and the platinum amount that can be directly deposited on the palladium-containing particle surface has been already determined. From this result, in the method for bringing the palladium-containing particle into direct contact with the platinum compound solution, it is presumed that platinum atoms are deposited only on the palladium surface on which the platinum is relatively unstable, and no platinum atoms are deposited on the palladium surface on which the platinum is relatively stable.

Accordingly, it is considered that the fine catalyst particle with excellent stability can be obtained by depositing the platinum on the palladium-containing particle surface that is relatively unstable and then depositing the platinum on other surface of the palladium-containing particle.

FIG. 1 is a schematic sectional view of a typical example of the first composite body obtained by this step. FIG. 1 is a view for explaining how the palladium-containing particle is covered with the platinum, and the first composite body of the present invention is not limited to the embodiment shown in FIG. 1.

As shown in FIG. 1, a typical example 100a of the first composite body is a composite body in which platinum atoms 2 are deposited on part of the surface of a palladium-containing particle 1. The typical example 100a of the first composite body has better mass activity and specific activity and shows a higher electrochemical surface area retention rate (which is an index of catalyst durability) than the conventional core-shell catalyst synthesized by Cu-UPD. Therefore, in the case of bringing the palladium-containing particle into direct contact with the platinum compound solution, it is considered that the platinum is deposited on part of Pd{110} surface that is composed of edges and corners that can be more easily eluted, and on part of Pd{111} surface that has higher oxygen reduction activity of platinum.

Meanwhile, it is considered that platinum which is obtained by Cu-UPD and in such an amount that the geometric coverage is about 60%, cannot cover the Pd{110} surface that can be easily eluted.

In this Specification, as the notation of a certain crystal surface of a metallic crystal, a combination of the chemical formula showing the chemical composition of the crystal (when the crystal is a single crystal, the elemental symbol) with the crystal surface is used. For example, "Pd{110}" means {110} surface of a palladium metal crystal. Also in this Specification, for the notation of crystal surface, a group of equivalent surfaces is noted in braces. For example, (110)

surface, (101) surface, (011) surface, (−1−10) surface, (−10−1) surface, (0−1−1) surface and the like are all noted as {110} surface.

In this step, the platinum covering at least part of the palladium-containing particle surface is high in activity as a catalyst for fuel cell, especially, in oxygen reduction reaction (ORR) activity. The platinum serves as a raw material for constituting the platinum outermost layer of the fine catalyst particle.

The first solution used in this step preferably contains an acid. Examples of the acid contained in the first solution include sulfuric acid, nitric acid, perchloric acid, hydrochloric acid and hypochlorous acid. Of them, sulfuric acid is preferred.

It is preferable to remove oxygen and so on from the first solution as much as possible, by bubbling an inert gas such as nitrogen gas or argon gas into the first solution in advance.

The amount of the platinum compound in the first solution is preferably determined from the area (or volume) of the platinum outermost layer to be formed, which is calculated from the average particle diameter of the palladium-containing particles. The average particle diameter of the palladium-containing particles can be calculated by the above-described method.

The amount of platinum atoms contained in the first solution can be 70 atm % or less, when the minimum amount of platinum atoms required to cover the palladium-containing particle with a monatomic layer of platinum (hereinafter may be referred to as "minimum platinum atom amount") is 100 atm %. As just described, by setting the amount of the platinum atoms contained in the first solution to a predetermined amount or less, the catalytic activity of the resulting first composite body itself can be increased higher, compared to the case of using the platinum atoms in an amount of 100 atm % or more at once.

When the minimum platinum atom amount is 100 atm %, the amount of the platinum atoms contained in the first solution is preferably 65 atm % or less, more preferably 60 atm % or less.

The time required for the formation of the first composite body is not particularly limited, as long as it is a time during which the platinum contained in the first solution can be sufficiently deposited on the palladium-containing particle surface, and the time can be appropriately controlled by a reaction scale. As an indication to finish the formation of the first composite body, for example, there may be mentioned the time when an increase in open circuit potential, which is increased by mixing the palladium-containing particle with the first solution, is stopped.

For example, the time required for the formation of the first composite body is about 1 to 24 hours, with respect to 1 to 100 g of the palladium-containing particles.

A concrete example of the step of forming the first composite body is as follows. First, the first solution, which has been already deoxidized, is gradually added in a reaction container containing the palladium-containing particle, in a dropwise manner. The amount of the first solution added in the container is 70 atm % or less, when the minimum amount of platinum atoms required to cover the palladium-containing particle with a monatomic layer of platinum is 100 atm %. With monitoring the self-potential inside the reaction container, the mixture is stirred until the potential reaches a plateau (that is, until the platinum covering reaction ends), thereby covering at least part of the palladium-containing particle surface with platinum.

Preferably, the palladium-containing particle is subjected to an acid treatment in advance, before the first composite body is formed. More preferably, the carrier on which the palladium-containing particle is supported is subjected to an acid treatment. As used herein, "acid treatment" encompasses such a treatment that the carrier on which the palladium-containing particle is supported is simply added to an acid solution, and such a treatment that the carrier on which the palladium-containing particle is supported is added to an acid solution and then a potential is applied thereto.

The acid solution which is preferably used in the present invention is an acid solution having an oxidation power that is sufficient to remove oxides on the palladium-containing particle surface. Concrete examples thereof include nitric acid, sulfuric acid, perchloric acid, hydrochloric acid and hypochlorous acid. Especially, from the viewpoint of having an oxidation power that is sufficient to dissolve mainly palladium, sulfuric acid is preferred. The concentration of the acid solution and the control of the acid solution atmosphere by bubbling can be appropriately adjusted depending on the type of the acid solution.

From the point of view that the potential treatment is evenly and quickly carried out on all of the palladium-containing particles, it is preferable that in the acid solution in which the palladium-containing particles are dispersed, the palladium-containing particles do not aggregate to each other and are uniformly dispersed in the acid solution.

When a potential is applied to the dispersion in the acid treatment, the applied potential is not particularly limited. For example, a 0.1 to 1.1 V square wave pattern can be applied.

Especially, a potential range of 0.4 to 0.6 V (vs. RHE) is preferred since it is a potential range that enables the removal of oxides (oxide film) on the palladium-containing particle surface. A potential of less than 0.4 V (vs. RHE) may cause the palladium to occlude hydrogen. On the other hand, a potential of more than 0.6 V (vs. RHE) may cause metals in the palladium-containing particle such as palladium to be eluted. Even when the applied potential is about 0.2 V below the lower limit of 0.4 V (vs. RHE), the cleaning effect of removing the oxides on the palladium-containing particle surface is comparable to the effect of a sweep in a potential range of 0.4 to 0.6 V (vs. RHE). The range of the potential applied in the acid treatment is preferably a range of 0.4 to 0.45 V (vs. RHE).

In the acid treatment, the potential treatment can be carried out by fixing the potential at a predetermined value, or a sweep in a predetermined potential range can be carried out one or more times, as long as the potential is in a range of 0.4 to 0.6 V (vs. RHE). From the point of view that desorption of materials adsorbing on the palladium-containing particle surface can be repeated and oxides present on the surface can be efficiently removed, the potential treatment carried out in the acid treatment is preferably such a potential treatment that the potential is swept between any two potentials in a range of 0.4 to 0.6 V (vs. RHE).

When the potential is swept between any two potentials, the number of sweeps can be appropriately controlled depending on the reaction scale. For example, the number of sweeps is around 1 to 1,000 cycles with respect to 1 to 100 g of the palladium-containing particles.

In the acid treatment, the potential applying time is not particularly limited, as long as it is a time during which the oxides on the palladium-containing particle surface can be sufficiently removed. The time can be appropriately controlled depending on the synthesis scale. For example, in the case of a potential treatment in which the potential is swept between any two potentials in a range of 0.4 to 0.6 V (vs. RHE), a state in which the trace of the waveform of the potential treatment almost overlaps with the trace of the waveform of the last sweep and, even after the potential is swept several times, the traces of the waveforms of the potential sweeps become almost the same as each other can serve as an indication to finish the applying of the potential. In this case, current fluctuation is constant with respect to the potential treatment, and it can be considered that almost all of the oxides on the palladium-containing particle surface disappeared.

The potential applying time is, for example, about 1 to 24 hours with respect to 1 to 100 g of the palladium-containing particles.

A concrete example of the acid treatment is as follows. First, the palladium-containing particles are added to water and appropriately dispersed therein. An acid solution is further added thereto. Then, a potential is swept back and forth in a range of 0.4 to 0.6 V (vs. RHE). At this time, it is preferable to remove oxygen and so on from the acid solution as much as possible, by bubbling an inert gas such as nitrogen gas or argon gas into the acid solution in advance.

As just described, by carrying out the potential treatment in advance on the palladium-containing particle before being covered with platinum, oxides adsorbing on the palladium-containing particle surface, such as palladium oxide, can be removed, so that the palladium-containing particle surface can be cleaned. By setting the applied potential to be in a range of 0.4 to 0.6 V (vs. RHE), preferably in a range of 0.4 to 0.45 V (vs. RHE), there is no possibility that metals such as palladium are eluted from the palladium-containing particle, and that hydrogen is occluded by the palladium. Therefore, there is no possibility that new oxides appear on the palladium-containing particle surface.

1-2. The Step of Forming the Second Composite Body

This is a step of forming the second composite body containing palladium, platinum and copper by mixing the first composite body with a second solution in which a copper compound is dissolved, and then covering at least part of the surface of the first composite body with copper using copper underpotential deposition (Cu-UPD). By Cu-UPD, the deposited copper amount can be uniform among the first composite bodies, when the first composite bodies are covered with copper.

In this step, the first composite body is mixed with the second solution in which the copper compound is dissolved. The embodiment of mixing the first composite body with the second solution is not particularly limited. For example, a powder of the first composite body itself can be mixed with the second solution; a powder of the carrier on which the first composite body is supported can be mixed with the second solution; a dispersion of the first composite body can be mixed with the second solution; or a dispersion of the carrier on which the first composite body is supported can be mixed with the second solution. That is, the first composite body can be in a solid state or in a state of being dispersed in solution. Also, it is not a matter whether the first composite body is supported on the carrier or not. In addition, the first composite body can be mixed with the second solution, while the first composite body is in a state of being dispersed in the above-described first solution.

In the present invention, the copper compound can exist as it is in "the second solution in which the copper compound is dissolved", or copper ions can exist therein. That is, the copper element derived from the copper compound is needed to be contained in the second solution. The copper compound used herein encompasses copper salts and copper complexes.

As other conditions of the Cu-UPD used in this step, publicly known conditions can be used.

A concrete example of this step is as follows. First, a copper compound such as copper sulfate is added to a reaction container containing the first composite body. Next, a potential which is approximately equal to the potential of the underpotential deposition (UPD potential) is applied to the reaction mixture so that only one atomic layer of copper is deposited on the first composite body. By this operation, the second composite body in which at least part of the first composite body surface is covered with copper, is formed.

1-3. The Step of Substituting the Copper in the Second Composite Body with Platinum This is a step of substituting the copper in the second composite body with platinum derived from a third solution in which a platinum compound is dissolved, by mixing the second composite body with the third solution.

In this step, preferably, the copper in the second composite body is substituted with the platinum derived from the third solution by mixing the second composite body with the third solution and then maintaining a potential until it becomes uniform.

The platinum compound which is dissolved in the third solution and the acid which is preferably contained in the third solution are the same as the first solution.

The amount of the platinum compound contained in the first solution and in the third solution can be appropriately controlled, depending on reaction conditions. From the viewpoint of minimizing the used platinum amount, it is preferable to keep the total amount of the platinum atoms contained in the first solution and in the third solution approximately equal to the above-described minimum platinum atom amount.

Figure 11:
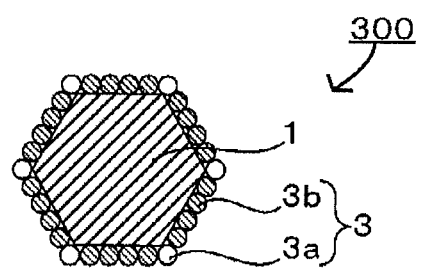
FIG. 11 is a schematic sectional view of the composite body in which the palladium particle surface is absolutely covered with copper atoms.

In the conventional production method using Cu-UPD, it is considered that the edges and so on of the palladium-containing particle surface are less likely to be substituted with the platinum, so that an incomplete core-shell structure is obtained. FIG. 11 is a schematic sectional view of the composite body in which the palladium particle surface is absolutely covered with copper atoms. As shown in FIG. 11, a composite body 300 is a particle in which copper atoms 3 are deposit on the surface of the palladium-containing particle 1. The copper atoms 3 include copper atoms 3$a$ which are deposited on the edges or corners of the palladium-containing particle surface, and copper atoms 3$b$ which are deposited on the terraces of the palladium-containing particle surface. It is known that oxygen atoms are likely to adsorb to the edges and corners of the palladium-containing particle surface and are less likely to be detached therefrom. Due to the same principle, the copper atoms 3$a$ have larger adsorbability to the palladium-containing particle surface than the copper atoms 3$b$. Accordingly, the copper atoms 3$a$ are less likely to be substituted with platinum. The platinum atoms not substituted with the copper atoms 3$a$ have no choice but to be deposited on other platinum atoms or on the carrier. As a result, although the platinum itself can be deposited, the contribution of the deposited platinum to ORR activity is small, so that the mass activity of the whole fine catalyst particle is decreased.

In the production method of the present invention, the first composite body as shown in FIG. 1 is further covered with platinum using Cu-UPD. As the platinum-covered state, two models shown in the bottom of FIG. 2 and FIG. 8 are expected.

Figure 8:
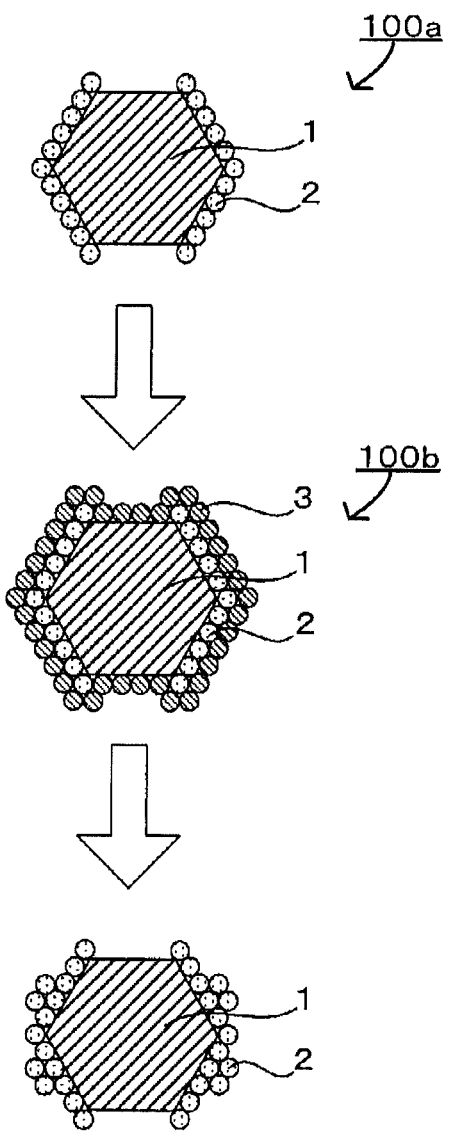
FIG. 8 is a schematic view showing a transition of a section in a covered state, which is expected from a conventional core-shell catalyst production method using Cu-UPD.

FIG. 8 is a schematic view showing a transition of a section in a covered state, which is expected from a conventional core-shell catalyst production method using Cu- UPD. The top of FIG. 8 is a schematic sectional view of the first composite body 100a and is the same as FIG. 1. The middle of FIG. 8 is a schematic sectional view of a second composite body 100b in which the first composite body surface is further covered with one monatomic layer composed of the copper atoms 3. The bottom of FIG. 8 is a schematic sectional view the second composite body 100b in such a state that the copper atoms 3 on the platinum atoms 2 have been preferentially substituted with the platinum atoms 2. Arrows between the views indicate the transition of the covered state.

In the model shown in the bottom of FIG. 8, for example, when the platinum and palladium exposed on the core-shell catalyst surface account for 60% and 40%, respectively, the specific activity of the core-shell catalyst is calculated to be 2.40 (A/m$^2$). This specific activity is no different from the specific activity of the first composite body 100a. However, as shown in the below-described Table 1, the specific activity of the fine catalyst particle obtained by the production method of the present invention (Example 1) is 4.73 (A/m$^2$), so that this model cannot be employed.

Figure 2:
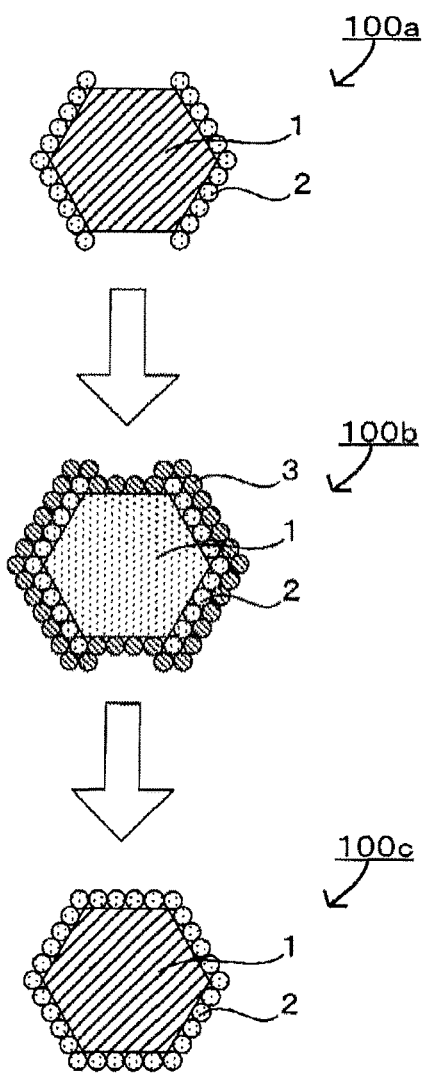
FIG. 2 is a schematic view showing a transition of a section in a covered state in the fine catalyst particle production method of the present invention.

FIG. 2 is a schematic view showing a transition of a section in a covered state when copper atoms on a palladium atom are preferentially substituted with platinum atoms. The figures shown in the top and middle of FIG. 2 are the same as those in the top and middle of FIG. 8. The bottom of FIG. 8 is a schematic sectional view showing the second composite body 100b in such a state that the copper atoms 3 on the surface of the palladium-containing particle 1 have been preferentially substituted with the platinum atoms 2. Arrows between the views indicate the transition of the covered state.

It is known that the specific activity of the platinum atoms on the palladium atoms is 1.3 times more than that of pure platinum. Since the specific activity of platinum is 3.2 (A/m$^2$), the specific activity of the platinum atoms on the palladium atoms is more than 4.2 (A/m$^2$) in terms of calculation. Accordingly, the above value of 4.73 (A/m$^2$) (the specific activity of Example 1) is almost equal to the value which is calculated on the assumption that 100% of the palladium particle surface is covered with platinum. That is, it can be said that a model 100c shown in the bottom of FIG. 2 is the fine catalyst particle produced by the present invention.

In a publicly known document (FIG. 2 in J. Greeley et al., Electrochimica Acta, 52 (2007) 5829-5836), it is described by first principle energy calculation, that an energy to separate a copper particle from the surface of a palladium host is lower than that to separate a copper particle from a platinum host. The calculation results described in the publicly known document are helpful in understanding the phenomenon shown by the model in the bottom of FIG. 2, that the copper atoms on the palladium-containing particle surface are more likely to be preferentially substituted with the platinum atoms, rather than the copper atoms on the platinum atoms.

Also, as shown in the below-described Table 1, the fine catalyst particle produced by the present invention has a very small difference between the mass activity before it is not in use and the mass activity after a potential cycle is applied (see Example 1). This fact indicates that just after the production, a complete core-shell structure in which the palladium-containing particle surface is almost absolutely covered with the platinum outermost layer that is responsible for ORR activity, is formed.

A concrete example of this step is as follows. First, in a dropwise manner, the third solution in which the platinum compound is dissolved is gradually added in a reaction container containing the second composite body. With monitoring the self-potential inside the reaction container, the mixture is stirred until the potential reaches a plateau (that is, until the platinum covering reaction ends), thereby substituting the copper monatomic layer on the palladium-containing particle surface with a platinum monatomic layer and obtaining the fine catalyst particle.

1-4. Other Steps

After the production of the fine catalyst particle, filtering, washing, drying and so on can be carried out on the fine catalyst particle.

The filtering and washing of the fine catalyst particle are not particularly limited, as long as they are carried out by methods that can remove impurities without any damage to the covered structure of the fine catalyst particle thus produced. An example of the filtering and washing is suction filtration using water, perchloric acid, dilute sulfuric acid, dilute nitric acid, etc.

The drying of the fine catalyst particle is not particularly limited, as long as it is carried out by a method that can remove solvents, etc. An example of the drying is such a method that the fine catalyst particle is vacuum-dried for 0.5 to 2 hours at room temperature, and then dried for 1 to 12 hours in a temperature condition of 60 to 80° C. under an inert gas atmosphere.

As described above, in the production method of the present invention, platinum is deposited on at least part of the palladium-containing particle surface without using Cu-UPD, and then platinum is further deposited on the rest of the palladium-containing particle surface using Cu-UPD; therefore, compared to conventional production methods using only Cu-UPD, the fine catalyst particle which shows higher mass activity and specific activity from the early stage (just after the production) and which has excellent durability, can be obtained. This result indicates that compared to conventional Cu-UPD, the production method of the present invention could build a core-shell structure that is close to the structure of a finished product (that is, fine catalyst particle with the highest activity). Due to its high degree of perfection, the mass activity, specific activity and electrochemical surface area can be maintained at the very same level as the early stage, even after a potential cycle is applied.

In addition, the present invention has such an advantage that in contrast to conventional synthesis methods using only Cu-UPD, the used copper amount is small and results in small copper-containing effluent discharged after the synthesis. Also, when the fine catalyst particle produced by the present invention is used in a membrane electrode assembly, the influence of copper remaining in the fine catalyst particle on the membrane electrode assembly, which has been a long-standing concern, is small.

As just described, compared to conventional synthesis methods, the production method of the present invention can more easily provide the fine catalyst particle with a higher coverage, at a lower cost.

2. The Second Method for Producing a Fine Catalyst Particle

The second fine catalyst particle production method of the present invention is a method for producing a fine catalyst particle comprising a palladium-containing particle and a platinum outermost layer covering the palladium-containing particle, wherein a composite body A containing palladium and copper is formed by mixing the palladium-containing particle with a second solution in which a copper compound is dissolved, and then covering at least part of a surface of the palladium-containing particle with copper using copper underpotential deposition; wherein a composite body B containing palladium and platinum is formed by mixing the composite body A with a third solution in which a platinum compound is dissolved, and substituting the copper in the composite body A with the platinum derived from the third solution; and wherein at least part of a surface of the composite body B is covered with platinum by mixing the composite body B with a first solution in which a platinum compound is dissolved.

In the first production method, the platinum covering step that uses Cu-UPD (the above "1-2. The step of forming the second composite body" and "1-3. The step of substituting the copper in the second composite body with platinum") is carried out after the platinum covering step that does not use Cu-UPD (the above "1-1. The step of forming the first composite body").

As the principle of the invention, there is no problem with the platinum covering even if, contrary to the above order, the platinum covering step that does not use Cu-UPD is carried out after the platinum covering step that uses Cu-UPD, and the same effects as the above-described production method can be obtained.

The step (A) is a step of carrying out Cu-UPD and corresponds to the above "1-2. The step of forming the second composite body". The step (A) and the above "1-2. The step of forming the second composite body" are different in that while the subject of Cu-UPD in the above "1-2. The step of forming the second composite body" is the first composite body containing palladium and platinum, the subject in the step (A) is the palladium-containing particle (raw material). However, in the step (A), the composite body A containing palladium and copper can be formed by carrying out Cu-UPD under almost the same conditions as the above "1-2. The step of forming the second composite body". Preferably, the palladium-containing particle is subjected to an acid treatment in advance, before the composite body A is formed. More preferably, the carrier on which the palladium-containing particle is supported is subjected to an acid treatment.

The step (B) corresponds to the above "1-3. The step of substituting the copper in the second composite body with platinum". The step (B) and the above "1-3. The step of substituting the copper in the second composite body with platinum" are different in that while the subject of the platinum covering in the above "1-3. The step of substituting the copper in the second composite body with platinum" is the second composite body containing palladium, platinum and copper, the subject in the step (B) is the composite body A containing palladium and copper. However, in the step (B), the composite body B containing palladium and platinum can be formed by substituting the copper with the platinum, under almost the same conditions as the above "1-3. The step of substituting the copper in the second composite body with platinum".

Excess copper remaining on the composite body B surface can be removed by washing the thus-obtained composite body B after the step (B) and before the step (C).

The step (C) corresponds to the above "1-1. The step of forming the first composite body". The step (C) and the above "1-1. The step of forming the first composite body" are different in that while the subject of the platinum covering in the above "1-1. The step of forming the first composite body" is the palladium-containing particle (raw material), the subject in the step (C) is the composite body B containing palladium and platinum. However, in the step (C), the target fine catalyst particle can be obtained by the platinum covering under almost the same conditions as the above "1-1. The step of forming the first composite body".

3. Fine Catalyst Particle

In the fine catalyst particle produced by the present invention, the coverage of the palladium-containing particle with the platinum outermost layer is preferably 88 to 100%. When the coverage is less than 88%, the palladium-containing particle is eluted in electrochemical reactions and may result in the deterioration of the fine catalyst particle.

In the fine catalyst particle produced by the present invention, the coverage of the palladium-containing particle with the platinum outermost layer is more preferably 89 to 100%, still more preferably 97 to 100%.

The platinum outermost layer formed in this step is preferably a monatomic layer. This is because there are such advantages that the catalytic performance of the platinum outermost layer of such a fine catalyst particle is extremely higher than fine catalyst particles in which the platinum outermost layer is composed of two or more atomic layers, and that the amount of the covering platinum outermost layer is small and results in low material costs.

The lower limit of the average particle diameter of the fine catalyst particles is preferably 3 nm or more, more preferably 4 nm or more, and the upper limit is preferably 40 nm or less, more preferably 10 nm or less.

The fine catalyst particle produced by the production method of the present invention is preferably supported on a carrier. The carrier is as described above.

4. Fuel Cell

The fuel cell of the present invention is a fuel cell comprising unit cells, each of which comprises a membrane electrode assembly in which an anode electrode comprising at least an anode catalyst layer is disposed on one side of a polyelectrolyte membrane and a cathode electrode comprising at least a cathode catalyst layer is disposed on another side of the polyelectrolyte membrane, wherein a fine catalyst particle produced by the first or second production method is contained in at least any one of the anode catalyst layer and the cathode catalyst layer.

Figure 3:
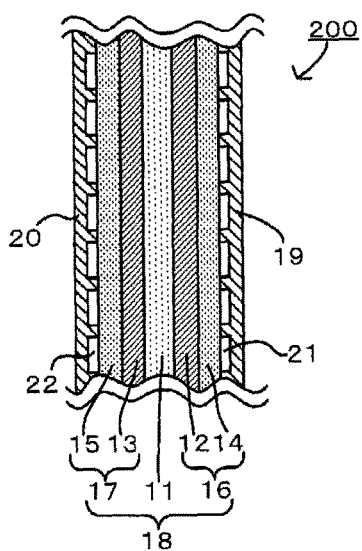
FIG. 3 is a view showing an example of the unit cell of the fuel cell of the present invention, and it is also a view schematically showing a section of the unit cell cut along a laminating direction.

FIG. 3 is a view showing an example of the unit cell of the fuel cell of the present invention, and it is also a view schematically showing a section of the unit cell cut along a laminating direction. A membrane electrode assembly 18 includes a hydrogen ion-conductive polyelectrolyte membrane (hereinafter may be simply referred to as electrolyte membrane) 11 and a pair of a cathode electrode 16 and an anode electrode 17 which sandwich the electrolyte membrane 11. A unit cell 200 includes the membrane electrode assembly 18 and a pair of separators 19 and 20 which sandwich the membrane electrode assembly 18 from the outside of the electrodes. Gas channels 21 and 22 are disposed at the boundaries of the separators and the electrodes. In general, a laminate of a catalyst layer and a gas diffusion layer stacked in this order from closest to the electrolyte membrane side, is used as the electrodes. That is, the cathode electrode 16 includes a laminate of a cathode catalyst layer 12 and a gas diffusion layer 14, and the anode electrode 17 includes an anode catalyst layer 13 and a gas diffusion layer 15. The catalyst for fuel cells according to the present invention is used in at least any one of the anode catalyst layer and the cathode catalyst layer.

The polyelectrolyte membrane is a polyelectrolyte membrane used in fuel cells. Examples thereof include fluorine-based polyelectrolyte membranes containing fluorine-based polyelectrolytes such as perfluorocarbon sulfonic acid resin as typified by Nafion (trademark), and hydrocarbon-based polyelectrolyte membranes containing hydrocarbon-based polyelectrolytes obtained by introducing a protonic acid group (proton conductive group) such as sulfonic acid group, carboxylic acid group, phosphoric acid group or boronic acid group to an engineering plastic such as polyether ether ketone, polyether ketone, polyether sulfone, polyphenylene sulfide, polyphenylene ether or polyparaphenylene or to a commodity plastic such as polyethylene, polypropylene or polystyrene.

Each of the electrodes includes the catalyst layer and the gas diffusion layer.

Both the anode catalyst layer and the cathode catalyst layer can be formed using a catalyst ink containing a catalyst, an electroconductive material and a polyelectrolyte. As the polyelectrolyte, there may be used the same material as the above-mentioned polyelectrolyte membrane. As the catalyst, the fine catalyst particle according to the present invention is used.

The fine catalyst particle according to the present invention can be used for only the anode catalyst layer, only the cathode catalyst layer, or both the anode catalyst layer and the cathode catalyst layer. When the fine catalyst particle according to the present invention is used for only the anode catalyst layer, a different catalyst is used for the cathode catalyst layer. When the fine catalyst particle according to the present invention is used for only the cathode catalyst layer, a different catalyst is used for the anode catalyst layer.

As the different catalyst, such a catalyst that a catalytic component is supported on an electroconductive particle is generally used. The catalytic component is not particularly limited, as long as it has catalytic activity to the oxidation reaction of a fuel supplied to the anode electrode or to the reduction reaction of an oxidant supplied to the cathode electrode, and there may be used a catalyst that is generally used for solid polymer type fuel cells. For example, there may be used platinum or an alloy of platinum and a metal such as ruthenium, iron, nickel, manganese, cobalt or copper. As the electroconductive particle which serves as the catalyst carrier, there may be used an electroconductive carbonaceous material such as a carbon particle or carbon fiber (e.g., carbon black) or a metal material such as a metal particle or metal fiber. The electroconductive material also has a role in imparting electroconductivity to the catalyst layer.

The method for forming the catalyst layer is not particularly limited. For example, the catalyst layer can be formed on a gas diffusion sheet by applying the catalyst ink to a surface of the gas diffusion sheet and drying the applied ink, or the catalyst layer can be formed on the polyelectrolyte membrane by applying the catalyst ink to a surface of the polyelectrolyte membrane and drying the applied ink. Or, the catalyst layer can be formed on the polyelectrolyte membrane or the gas diffusion sheet by the following method: a transfer sheet is produced by applying the catalyst ink to a surface of a transfer substrate and drying the applied ink; the transfer sheet is attached to the polyelectrolyte membrane or the gas diffusion sheet by hot pressing or the like; and the substrate film of the transfer sheet is removed, thereby forming the catalyst layer on the polyelectrolyte membrane or the gas diffusion sheet.

The catalyst ink can be obtained by dispersing the above-mentioned catalyst, an electrolyte for electrodes, and so on in a solvent. The solvent for the catalyst ink can be appropriately selected. For example, there may be used an organic solvent such as alcohol (e.g., methanol, ethanol, propanol), N-methyl-2-pyrrolidone (NMP) or dimethylsulfoxide (DMSO), a mixture of the organic solvents, or a mixture of water and any of the organic solvents. In addition to the catalyst and the electrolyte, the catalyst ink can contain other components such as a binder and a water repellent resin, as needed.

The method for applying the catalyst ink, the method for drying the catalyst ink, etc., can be appropriately selected. As the catalyst ink applying method, for example, there may be mentioned a spraying method, a screen printing method, a doctor blade method, a gravure printing method and a die coating method. As the catalyst ink drying method, for example, there may be mentioned reduced-pressure drying, heat drying and heat drying under reduced pressure. The detailed conditions of the reduced-pressure drying or the heat drying are not particularly limited and can be appropriately determined. The thickness of the catalyst layer is not particularly limited and can be about 1 to 50 µm.

As the gas diffusion sheet for forming the gas diffusion layer, there may be mentioned one having gas diffusivity which enables efficient fuel supply to the catalyst layer, electroconductivity, and strength required of the material for constituting the gas diffusion layer. Examples thereof include carbonaceous porous materials such as carbon paper, carbon cloth and carbon felt, and electroconductive porous materials such as metal mesh and metal porous materials made of metals such as titanium, aluminum and alloys thereof, nickel, nickel-chromium alloy, copper and alloys thereof, silver, zinc alloy, lead alloy, niobium, tantalum, iron, stainless-steel, gold, platinum, etc. The thickness of the electroconductive porous material is preferably about 50 to 500 µm.

The gas diffusion sheet may be made of a single layer of the electroconductive porous material, or a water repellent layer can be provided on a catalyst layer-facing side of the sheet. In general, the water repellent layer has a porous structure that contains an electroconductive powder and granular material such as carbon particles or carbon fibers, a water repellent resin such as polytetrafluoroethylene (PTFE), etc. The water repellent layer is not always necessary; however, it has such an advantage that the drainage property of the gas diffusion layer can be increased, with appropriately maintaining the water content in the catalyst layer and the polyelectrolyte membrane, and the electrical contact between the catalyst layer and the gas diffusion layer can be improved.

The polyelectrolyte membrane having the catalyst layer formed thereon by the above-mentioned method and the gas diffusion sheet can be appropriately stacked and attached to each other by hot pressing or the like, thereby obtaining a membrane electrode assembly.

The membrane electrode assembly thus produced is preferably sandwiched between a pair of separators having a reaction gas channel, thereby forming a unit cell. As the separators, there may be used separators having electroconductivity and gas sealing properties and being able to serve as a current collector and gas sealer, such as carbon separators containing carbon fibers at high concentration and being made of a composite with a resin, or metal separators made of a metal material. Examples of the metal separators include separators made of a metal material with excellent corrosion resistance and separators being coated with carbon or a metal material with excellent corrosion resistance and thus having a coating thereon for increased corrosion resistance. The above-described reaction gas channel can be formed by appropriately cutting or compression molding the separators, for example.

EXAMPLES

Hereinafter, the present invention will be described in more detail, by way of examples and comparative examples. However, the scope of the present invention is not limited to these examples.

1. Production of Fine Catalyst Particle-containing Catalyst for Fuel Cells

Example 1

1-1. Pre-treatment of Carbon-supported Palladium Particle

First, 5 g of carbon-supported palladium particles are added to 1 L of pure water and dispersed therein using an ultrasonic homogenizer. The thus-obtained dispersion was added in an electrochemical reactor and mixed with sulfuric acid to achieve the sulfuric acid concentration of 0.05 mol/L. The electrochemical reactor was placed in a glove box. The dispersion was deoxidized by sufficiently bubbling an inert gas ($N_2$ gas) into the dispersion. Then, a potential window of 0.4 to 0.45 V (vs. RHE) was applied for 360 cycles on the working electrode of the electrochemical reactor to sufficiently reduce the palladium particle surface.

1-2. Formation of First Composite Body

In the electrochemical reactor, a deoxidized sulfuric acid solution of $K_2PtCl_4$ was gradually added in a dropwise manner. The amount of the sulfuric acid solution of $K_2PtCl_4$ added was 55 atm % when the minimum amount of platinum atoms required to cover the palladium particle with a monatomic layer of platinum is 100 atm %. With monitoring the self-potential inside the electrochemical reactor, the mixture was stirred until the potential reached a plateau (that is, until the platinum covering reaction ended), thereby covering part of the palladium particle surface with platinum.

Figure 4:
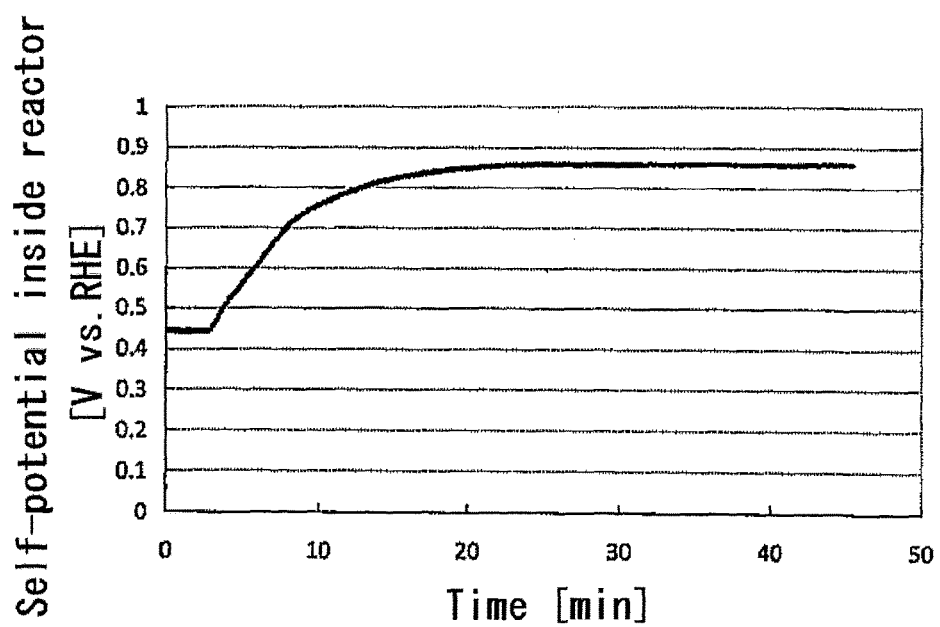
FIG. 4 is a graph showing a transition observed by monitoring the formation of the first composite body in Example 1.

FIG. 4 is a graph showing a transition observed by monitoring the formation of the first composite body in Example 1. In FIG. 4, the sulfuric acid solution of $K_2PtCl_4$ started to be added in a dropwise manner at the point that two minutes passed from the start of the measurement. As is clear from FIG. 4, just after starting the addition of the sulfuric acid solution of $K_2PtCl_4$, the self-potential started to increase somewhat quickly; however, due to the consumption of the $K_2PtCl_4$, the increase in the self-potential became gradual. After 20 minutes passed from the start of the measurement, the self-potential reached a plateau at 0.86 V (vs. RHE) and the reaction ended.

1-3. Formation of Second Composite Body

In the electrochemical reactor containing the first composite body, a deoxidized 0.05 mol/L sulfuric acid solution of copper sulfate ($CuSO_4$) was added, and the copper ion ($Cu^{2+}$) concentration of the mixture was controlled to be 0.05 mol/L. Then, 0.37 V (vs. RHE) was applied to the working electrode of the electrochemical reactor, and the potential was maintained as it was until the current value became 0 A (Cu-UPD). By this operation, the second composite body in which at least part of the surface of the first composite body was covered with copper, was formed.

1-4. Substitution of Copper Atomic Layer with Platinum Outermost Layer

In the electrochemical reactor containing the second composite body, a deoxidized sulfuric acid solution of $K_2PtCl_4$ was gradually added in a dropwise manner. With monitoring the self-potential inside the electrochemical reactor, the mixture was stirred until the self-potential reached a plateau (that is, until no change was seen in the self-potential), thereby substituting the copper monatomic layer on the palladium particle surface with a platinum layer and synthesizing fine catalyst particles. The amount of the sulfuric acid solution of $K_2PtCl_4$ added was the rest of the amount used for the formation of the first composite body, that is, 45 atm % when the minimum amount of platinum atoms required to cover the palladium particle with a monatomic layer of platinum is 100 atm %.

Figure 5:
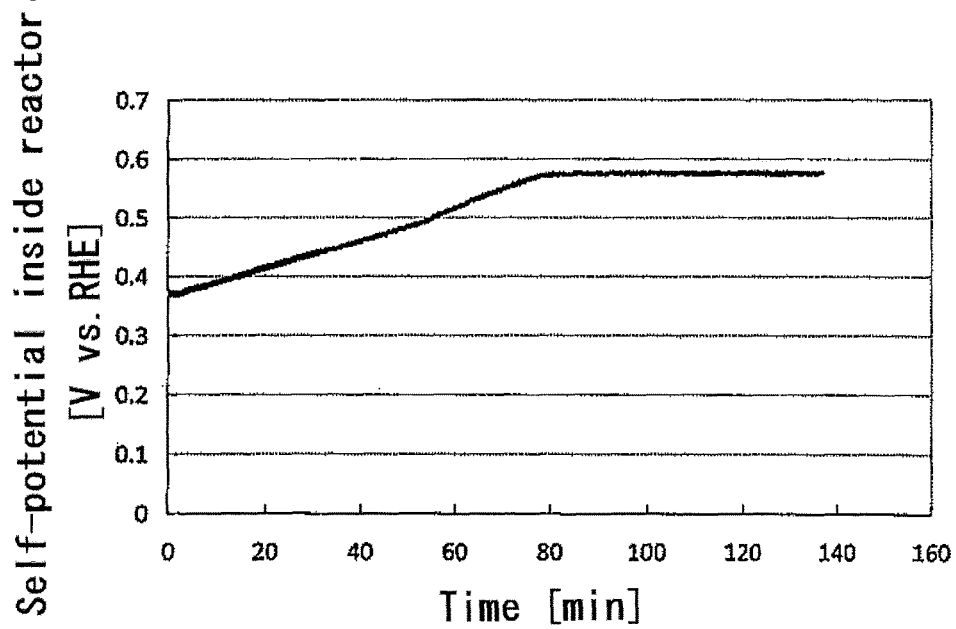
FIG. 5 is a graph showing a transition observed by monitoring the substitution of the copper atomic layer with the platinum outermost layer in Example 1.

FIG. 5 is a graph showing a transition observed by monitoring the substitution of the copper atomic layer with the platinum outermost layer in Example 1. As is clear from FIG. 5, just after starting the addition of the $K_2PtCl_4$ sulfuric acid solution (0 minute), the self-potential started to increase; however, at the point that the $K_2PtCl_4$ was consumed (80 minutes after the start), the self-potential reached a plateau at 0.58 V (vs. RHE) and the reaction ended. The reason why the potential increased only up to 0.58 V (vs. RHE) is considered as follows: the platinum was deposited on the palladium particle surface in the formation of the first composite body, and then the copper was deposited on the platinum by the Cu-UPD; however, the copper remained thereon.

1-5. Post-treatment

Impurities (such as excess ions and the copper deposited on the platinum) were removed by filtering the mixture contained in the electrochemical container and washing the resultant with 4 L of pure water. After the washing, the resultant was vacuum-dried at 60° C. for 10 hours, thereby producing the catalyst for fuel cells of Example 1, in which the fine catalyst particles were contained.

Reference Example 1

First, a pre-treatment was carried out in the same manner as the above "1-1. Pre-treatment of carbon-supported palladium particle" in Example 1.

Next, in an electrochemical reactor, a deoxidized sulfuric acid solution of $K_2PtCl_4$ was gradually added in a dropwise manner. The amount of the sulfuric acid solution of $K_2PtCl_4$ added was 120 atm % (St=1.2) when the minimum amount of platinum atoms required to cover the palladium particle with a monatomic layer of platinum is 100 atm %. With monitoring the self-potential inside the electrochemical reactor, the mixture was stirred until the potential reached a plateau (that is, until the platinum covering reaction ended), thereby covering the palladium particle surface with the platinum.

Figure 6:
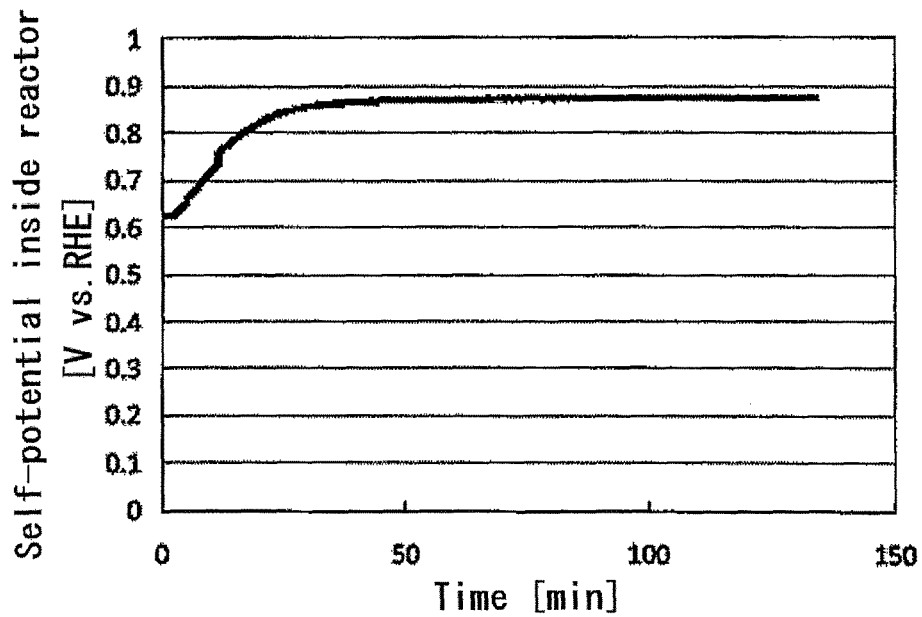
FIG. 6 is a graph showing a transition observed by monitoring the covering with platinum in Reference Example 1.

FIG. 6 is a graph showing a transition observed by monitoring the covering with platinum in Reference Example 1. As is clear from FIG. 6, just after starting the addition of the sulfuric acid solution of $K_2PtCl_4$, the self-potential started to increase rapidly; however, due to the consumption of the $K_2PtCl_4$, the increase in the self-potential became gradual. After 40 minutes passed from the start of the measurement, the self-potential reached a plateau at 0.88 V (vs. RHE) and the reaction ended.

Thereafter, a post-treatment was carried out in the same manner as the above "1-5. Post-treatment" in Example 1, thereby producing the catalyst for fuel cells of Reference Example 1, in which the fine catalyst particles were contained.

Reference Example 2

The catalyst for fuel cells of Reference Example 2, in which the fine catalyst particles were contained, was produced by carrying out a pre-treatment, platinum covering and post-treatment in the same manner as Reference Example 1, except that in the addition of the sulfuric acid solution of $K_2PtCl_4$ in a dropwise manner, the amount of the sulfuric acid solution of $K_2PtCl_4$ added was 100 atm % (St=1.0) when the minimum amount of platinum atoms required to cover the palladium particle with a monatomic layer of platinum is 100 atm %.

Comparative Example 1

First, a pre-treatment was carried out in the same manner as the above "1-1. Pre-treatment of carbon-supported palladium particle" in Example 1.

Next, in the electrochemical reactor containing the carbon-supported palladium particles, a deoxidized 0.05 mol/L sulfuric acid solution of copper sulfate ($CuSO_4$) was added, and the copper ion ($Cu^{2+}$) concentration of the mixture was controlled to be 0.05 mol/L. Then, 0.37 V (vs. RHE) was applied to the working electrode of the electrochemical reactor, and the potential was maintained as it was until the current value became 0 A (Cu-UPD). By this operation, the palladium particle surface was covered with a copper atomic layer. This step corresponds to the above "1-3. Formation of second composite body" in Example 1.

Then, in the electrochemical reactor containing the palladium-copper composite body, a deoxidized sulfuric acid solution of $K_2PtCl_4$ was gradually added in a dropwise manner. With monitoring the self-potential inside the electrochemical reactor, the solution was added in a dropwise manner until the self-potential became 0.65 V (vs. RHE). Then, the addition of the sulfuric acid solution of $K_2PtCl_4$ was stopped. By this operation, the copper atomic layer on the palladium particle surface was substituted with a platinum outermost layer. This step corresponds to the above "1-4. Substitution of copper atomic layer with platinum outermost layer" in Example 1.

Figure 9:
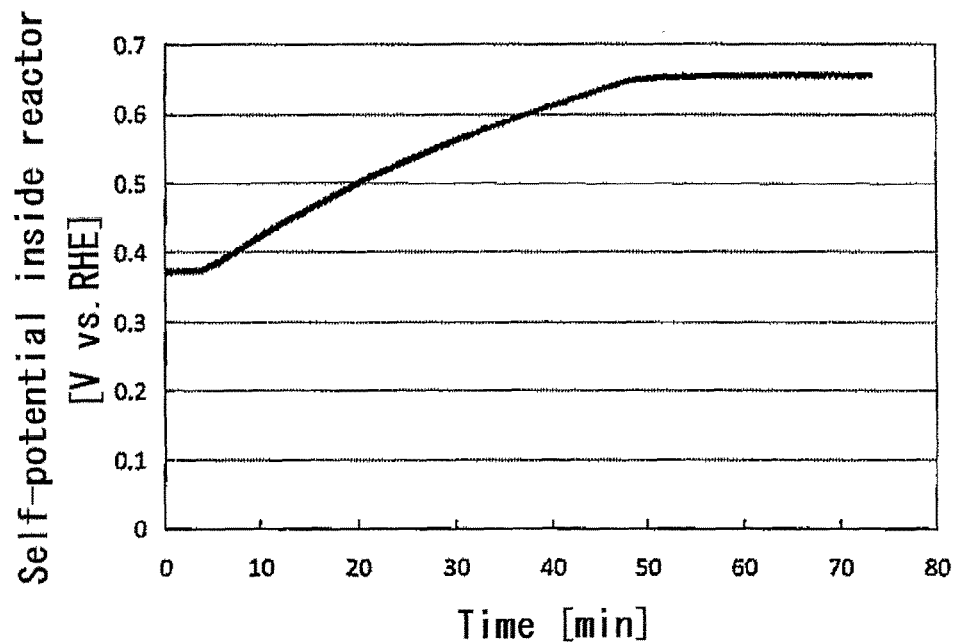
FIG. 9 is a graph showing a transition observed by monitoring the substitution of the copper atomic layer with the platinum outermost layer in Comparative Example 1.

FIG. 9 is a graph showing a transition observed by monitoring the substitution of the copper atomic layer with the platinum outermost layer in Comparative Example 1. In FIG. 9, the sulfuric acid solution of $K_2PtCl_4$ started to be added in a dropwise manner at the point that 4 minutes passed from the start of the measurement. As is clear from FIG. 9, just after starting the addition of the sulfuric acid solution of $K_2PtCl_4$, the self-potential inside the reactor continued to increase until it became 0.65 V (vs. RHE) (50 minutes after the start of the measurement).

Thereafter, a post-treatment was carried out in the same manner as the above "1-5. Post-treatment" in Example 1, thereby producing the catalyst for fuel cells of Comparative Example 1, in which the fine catalyst particles were contained.

Comparative Example 2

First, a pre-treatment was carried out in the same manner as the above "1-1. Pre-treatment of carbon-supported palladium particle" in Example 1.

Next, in the electrochemical reactor containing the carbon-supported palladium particles, a deoxidized 0.05 mol/L sulfuric acid solution of copper sulfate ($CuSO_4$) was added, and the copper ion ($Cu^{2+}$) concentration of the mixture was controlled to be 0.05 mol/L. Then, 0.37 V (vs. RHE) was applied to the working electrode of the electrochemical reactor, and the potential was maintained as it was until the current value became 0 A (Cu-UPD). By this operation, the palladium particle surface was covered with a copper atomic layer. This step corresponds to the above "1-3. Formation of second composite body" in Example 1.

Then, in the electrochemical reactor containing the palladium-copper composite body, a deoxidized sulfuric acid solution of $K_2PtCl_4$ was gradually added in a dropwise manner. With monitoring the self-potential inside the electrochemical reactor, the solution was added in a dropwise manner until the self-potential reached a plateau (that is, until no change was seen in the self-potential). Then, the addition of the sulfuric acid solution of $K_2PtCl_4$ was stopped. The amount of the sulfuric acid solution of $K_2PtCl_4$ added was 120 atm % (St=1.2) when the minimum amount of platinum atoms required to cover the palladium particle with a monatomic layer of platinum is 100 atm %. By this operation, the copper atomic layer on the palladium particle surface was substituted with a platinum outermost layer. This step corresponds to the above "1-4. Substitution of copper atomic layer with platinum outermost layer" in Example 1.

Figure 10:
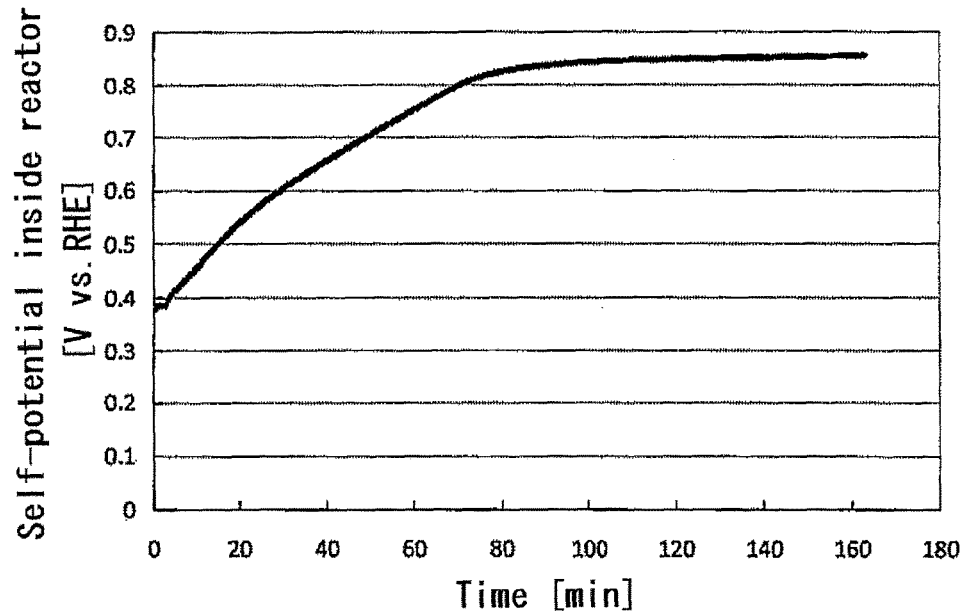
FIG. 10 is a graph showing a transition observed by monitoring the substitution of the copper atomic layer with the platinum outermost layer in Comparative Example 2.

FIG. 10 is a graph showing a transition observed by monitoring the substitution of the copper atomic layer with the platinum outermost layer in Comparative Example 2. In FIG. 10, the sulfuric acid solution of $K_2PtCl_4$ started to be added in a dropwise manner at the point that two minutes passed from the start of the measurement. As is clear from FIG. 10, just after starting the addition of the sulfuric acid solution of $K_2PtCl_4$, the self-potential started to increase; however, due to the consumption of the $K_2PtCl_4$, the increase in the self-potential became gradual. After 80 minutes passed from the start of the measurement, the self-potential reached a plateau at 0.85 V (vs. RHE) and the reaction ended.

Thereafter, a post-treatment was carried out in the same manner as the above "1-5. Post-treatment" in Example 1, thereby producing the catalyst for fuel cells of Comparative Example 2, in which the fine catalyst particles were contained.

Comparative Example 3

The catalyst for fuel cells of Comparative Example 3, in which the fine catalyst particles were contained, was produced by carrying out a pre-treatment, platinum covering and post-treatment in the same manner as Comparative Example 2, except that in the addition of the sulfuric acid solution of $K_2PtCl_4$ in a dropwise manner, the amount of the sulfuric acid solution of $K_2PtCl_4$ added was 100 atm % (St=1.0) when the minimum amount of platinum atoms required to cover the palladium particle with a monatomic layer of platinum is 100 atm %.

2. Evaluation of Catalysts for Fuel Cells 2-1. Analysis of Platinum and Palladium Compositions, and Calculation of Coverage For the catalysts for fuel cells of Example 1, Reference Examples 1 and 2 and Comparative Examples 1 to 3, the platinum and palladium amounts on the fine catalyst particle surface were quantified by ICP-MS, and the coverage was calculated. The results are shown in Table 1.

2-2. Measurement of Mass Activity and Electrochemical Surface Area of Catalysts for Fuel Cells For the catalysts for fuel cells of Example 1, Reference Example 1 and Comparative Examples 1 to 3, the mass activity (ORR activity @ 0.9 V vs. RHE) and the electrochemical surface area (ECSA) were calculated by the rotating disk electrode (RDE) method. Also, on these catalysts for fuel cells, 100 potential cycles in a range of 1.05 to 0.1 V (vs. RHE) were swept back and forth; thereafter, the mass activity (ORR activity @ 0.9 V vs. RHE) and the electrochemical surface area (ECSA) were measured by the RDE method.

2-3. Experimental Results

The following Table 1 shows the added platinum amount, ICP measurement results, mass activity, electrochemical surface area and specific activity of the catalysts for fuel cells of Example 1, Reference Examples 1 and 2, and Comparative Examples 1 to 3. The specific activity was calculated from the results of the mass activity and electrochemical surface area. In the following Table 1, "initial" means the result of a new catalyst for fuel cells that was not used for charging and discharging.

From Table 1, as for the catalyst for fuel cells of Comparative Example 1, the initial mass activity is 394 (A/g-Pt); the mass activity after the potential cycles is 493 (A/g-Pt); and the change rate is 25.1%. Also, as for the catalyst for fuel cells of Comparative Example 1, the initial electrochemical surface area is 202 ($m^2$/g-Pt); the electrochemical surface area after the potential cycles is 162 ($m^2$/g-Pt); and the change rate (decrease rate) is −19.8%. The absolute value of the decrease rate is the largest among the catalysts for fuel cells of Example 1, Reference Example 1 and Comparative Examples 1 to 3. In addition, as for the catalyst for fuel cells of Comparative Example 1, the initial specific activity is

TABLE 1

| | Added platinum amount (St) | ICP measurement results | | Coverage (%) | Mass activity (A/g-Pt) | | | Electrochemical surface area ($m^2$/g-Pt) | | | Specific activity (A/$m^2$) | | |
|---|---|---|---|---|---|---|---|---|---|---|---|---|---|
| | | Pt (%) | Pd (%) | | Initial | After potential cycles | Change rate (%) | Initial | After potential cycles | Change rate (%) | Initial | After potential cycles | Change rate (%) |
| Example 1 | 1.0 | 12.1 | 14.4 | 88 | 624 | 629 | 0.801 | 132 | 123 | −6.82 | 4.73 | 5.11 | 8.03 |
| Reference Example 1 | 1.2 | 6.58 | 13.9 | 62 | 525 | 654 | 24.6 | 219 | 202 | −7.76 | 2.40 | 3.24 | 35.0 |
| Reference Example 2 | 1.0 | 6.40 | 13.8 | 61 | — | — | — | — | — | — | — | — | — |
| Comparative Example 1 | 0.65 | 7.69 | 14.6 | 67 | 394 | 493 | 25.1 | 202 | 162 | −19.8 | 1.95 | 3.04 | 55.9 |
| Comparative Example 2 | 1.2 | 13.2 | 13.0 | 97 | 470 | 730 | 55.3 | 124 | 115 | −7.26 | 3.79 | 6.35 | 67.5 |
| Comparative Example 3 | 1.0 | 12.4 | 14.4 | 89 | 503 | 785 | 56.1 | 140 | 123 | −12.1 | 3.59 | 6.38 | 77.7 |

Figure 7:
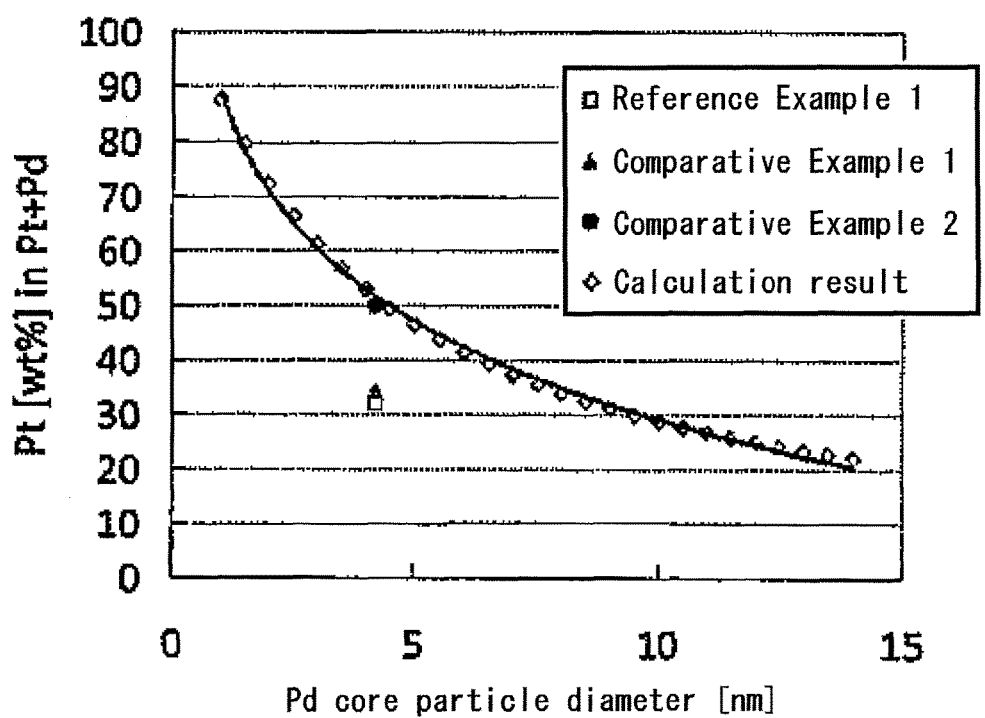
FIG. 7 is a graph showing the ratio of platinum on the surface of the palladium particle (core) with respect to the average particle diameter of the palladium particles.

FIG. 7 is a graph showing the ratio of platinum on the surface of the palladium particle (core) with respect to the average particle diameter of the palladium particles. The platinum ratio x on the palladium particle surface (%, the vertical axis of the graph) is obtained by the following formula (1), from the Pt ratio $x_{Pt}$ (%) and the Pd ratio $x_{Pd}$ (%) of the ICP measurement results shown in Table 1.

$$x = x_{Pt}/(x_{Pt}+x_{Pd}) \quad \text{Formula (1):}$$

In FIG. 7, white square plots indicate the data of Reference Example 1; black triangle plots indicate the data of Comparative Example 1; and black circle plots indicate the data of Comparative Example 2. White diamond plots indicate the data showing the calculation results in the case where the palladium particle surface is covered with only one platinum layer. Also, the curve shown in FIG. 7 represents an approximate expression relating to all the plots. The approximate expression (the theoretically-obtained approximate expression of the platinum monatomic layer) is as follows:

$$y = -25.924 \ln(x) + 88.944$$

Based on the results shown in Table 1 and FIG. 7, Comparative Example 1 will be discussed first.

From the ICP measurement results shown in Table 1, as for the catalyst for fuel cells of Comparative Example 1, it is clear that the platinum present on the catalyst surface is 7.69%, and the palladium present thereon is 14.6%. From this result, the platinum ratio x on the palladium particle surface is calculated as follows: x=7.69/(7.69+14.6)=34%. Therefore, as is also clear from FIG. 7, the platinum amount in Comparative Example 1 (the black triangle plots) is an amount that is not sufficient to cover the palladium particle surface with one platinum layer. Also, the coverage calculated from the ICP measurement results is 67%.

1.95 (A/$m^2$); the specific activity after the potential cycles is 3.04 (A/$m^2$); and the change rate is 55.9%.

Accordingly, as for the catalyst for fuel cells of Comparative Example 1, which was obtained by forming the platinum outermost layer halfway using conventional Cu-UPD, it is clear that the platinum outermost layer-covered state was not completed yet even when the catalyst was new. As for the catalyst for fuel cells of Comparative Example 1, it is also clear that the electrochemical surface area is very easily decreased by a pre-conditioning interim operation.

Next, Comparative Example 2 will be discussed. From the ICP measurement results shown in Table 1, as for the catalyst for fuel cells of Comparative Example 2, it is clear that the platinum present on the catalyst surface is 13.2%, and the palladium present thereon is 13.0%. From this result, the platinum ratio x on the palladium particle surface is calculated as follows: x=13.2/(13.2+13.0)=50%. Therefore, as is clear from FIG. 7, the platinum amount in Comparative Example 2 (the black circle plots) is an amount that can almost cover the palladium particle surface with one platinum layer. Also, the coverage calculated from the ICP measurement results is 97%.

From Table 1, as for the catalyst for fuel cells of Comparative Example 2, the initial mass activity is 470 (A/g-Pt); the mass activity after the potential cycles is 730 (A/g-Pt); and the change rate is 55.3%. Also, as for the catalyst for fuel cells of Comparative Example 2, the initial electrochemical surface area is 124 ($m^2$/g-Pt); the electrochemical surface area after the potential cycles is 115 ($m^2$/g-Pt); and the change rate (decrease rate) is −7.26%. In addition, as for the catalyst for fuel cells of Comparative Example 2, the initial specific activity is 3.79 (A/$m^2$); the specific activity after the potential cycles is 6.35 (A/$m^2$); and the change rate is 67.5%.

Accordingly, as for the catalyst for fuel cells of Comparative Example 2 which was obtained by forming the platinum outermost layer until the self-potential reached a plateau in conventional Cu-UPD, it is clear that the mass activity of the catalyst when the catalyst was new is less than two-thirds of the mass activity thereof after the potential cycles, and the platinum outermost layer-covered state was not yet completed at all. As for the catalyst for fuel cells of Comparative Example 2, it is also clear that the electrochemical surface area is very easily decreased by a pre-conditioning interim operation.

Next, Comparative Example 3 will be discussed. From the ICP measurement results shown in Table 1, as for the catalyst for fuel cells of Comparative Example 3, it is clear that the platinum present on the catalyst surface is 12.4%, and the palladium present thereon is 14.4%. From this result, the platinum ratio x on the palladium particle surface is calculated as follows: x=12.4/(12.4+14.4)=46%. Therefore, the platinum amount in Comparative Example 2 is an amount that can almost cover the palladium particle surface with one platinum layer. Also, the coverage calculated from the ICP measurement results is 89%.

From Table 1, as for the catalyst for fuel cells of Comparative Example 3, the initial mass activity is 503 (A/g-Pt); the mass activity after the potential cycles is 785 (A/g-Pt); and the change rate is 56.1%. This change rate is the largest among the catalysts for fuel cells of Example 1, Reference Example 1 and Comparative Examples 1 to 3. Also, as for the catalyst for fuel cells of Comparative Example 3, the initial electrochemical surface area is 140 (m$^2$/g-Pt); the electrochemical surface area after the potential cycles is 123 (m$^2$/g-Pt); and the change rate (decrease rate) is −12.1%. In addition, as for the catalyst for fuel cells of Comparative Example 3, the initial specific activity is 3.59 (A/m$^2$); the specific activity after the potential cycles is 6.38 (A/m$^2$); and the change rate is 77.7%.

Accordingly, as for the catalyst for fuel cells of Comparative Example 3 which was obtained by forming the platinum outermost layer until the self-potential reaches a plateau in conventional Cu-UPD, it is clear that the mass activity of the catalyst when the catalyst was new is less than two-thirds of the mass activity thereof after the potential cycles, and the platinum outermost layer state was not yet completed at all. As for the catalyst for fuel cells of Comparative Example 3, it is also clear that the electrochemical surface area is very easily decreased by a pre-conditioning interim operation.

From a comparison between Comparative Examples 2 and 3 in which the added platinum amount of Comparative Example 2 (St=1.2) is larger than that of Comparative Example 3 (St=1.0), it is clear that the platinum ratio on the palladium particle surface is slightly larger in Comparative Example 2 than in Comparative Example 3; the change rate of the mass activity is slightly smaller in Comparative Example 2 than in Comparative Example 3; and the absolute value of the change rate (decrease rate) of the electrochemical surface area is smaller in Comparative Example 2 than in Comparative Example 3.

Meanwhile, from the ICP measurement results shown in Table 1, as for the catalyst for fuel cells of Example 1, it is clear that the platinum present on the catalyst surface is 12.1%, and the palladium present thereon is 14.4%. From this results, the platinum ratio x on the palladium particle surface is calculated as follows: x=12.1/(12.1+14.4)=46%. Therefore, the platinum amount in Comparative Example 2 is an amount that can almost cover the palladium particle surface with one platinum layer (see FIG. 7). Also, the coverage calculated from the ICP measurement results is 88%.

From Table 1, as for the catalyst for fuel cells of Example 1, the initial mass activity is 624 (A/g-Pt); the mass activity after the potential cycles is 629 (A/g-Pt); and the change rate is 0.801%. This change rate is the smallest among the catalysts for fuel cells of Example 1, Reference Example 1 and Comparative Examples 1 to 3. Also, as for the catalyst for fuel cells of Example 1, the initial electrochemical surface area is 132 (m$^2$/g-Pt); the electrochemical surface area after the potential cycles is 123 (m$^2$/g-Pt); and the change rate (decrease rate) is −6.82%. The absolute value of the decrease rate is the smallest among the catalysts for fuel cells of Example 1, Reference Example 1 and Comparative Examples 1 to 3. In addition, as for the catalyst for fuel cells of Example 1, the initial specific activity is 4.73 (A/m$^2$); the specific activity after the potential cycles is 5.11 (A/m$^2$); and the change rate is 8.03%. The initial specific activity of Example 1 is the largest among the catalysts for fuel cells of Example 1, Reference Example 1 and Comparative Examples 1 to 3. Also, the change rate of the specific activity of Example 1 is the smallest among the catalysts for fuel cells of Example 1, Reference Example 1 and Comparative Examples 1 to 3.

From the above, as for the catalyst for fuel cells of Example 1 which was obtained by immersing the palladium particles in the platinum compound solution and then Cu-UPD, it is clear that the platinum outermost layer was already almost completed when the catalyst was new, and the catalyst can be used as it is for catalytic reaction, without any pre-conditioning interim operation. Also, as for the catalyst for fuel cells of Example 1, it is clear that the electrochemical surface area is not easily decreased, and the durability is excellent.

Next, Reference Example 1 will be discussed. From the ICP measurement results shown in Table 1, as for the catalyst for fuel cells of Reference Example 1, it is clear that the platinum present on the catalyst surface is 6.58%, and the palladium present thereon is 13.9%. From this result, the platinum ratio x on the palladium particle surface is calculated as follows: x=6.58/(6.58+13.9)=32%. Therefore, as is also clear from FIG. 7, the platinum amount in Reference Example 1 (the white square plots) is an amount that is not sufficient to cover the palladium particle surface with one platinum layer. Also, the coverage calculated from the ICP measurement results is 62%.

From Table 1, as for the catalyst for fuel cells of Reference Example 1, the initial mass activity is 525 (A/g-Pt); the mass activity after the potential cycles is 654 (A/g-Pt); and the change rate is 24.6%. Also, as for the catalyst for fuel cells of Reference Example 1, the initial electrochemical surface area is 219 (m$^2$/g-Pt); the electrochemical surface area after the potential cycles is 202 (m$^2$/g-Pt); and the change rate (decrease rate) is −7.76%. In addition, as for the catalyst for fuel cells of Reference Example 1, the initial specific activity is 2.40 (A/m$^2$); the specific activity after the potential cycles is 3.24 (A/m$^2$); and the change rate is 35.0%.

The ICP measurement results of Reference Example 1 will be further discussed. According to the ICP measurement results of the carbon-supported palladium particles (raw material) of Reference Example 1, the palladium ratio on the surface of the catalyst for fuel cells is 15.9%.

Given that the palladium of the palladium particle surface, which corresponds to one palladium layer, is eluted and the platinum is deposited (hereinafter, this model may be referred to as "palladium-eluted model"). The number of palladium atoms of the palladium particle surface when the palladium particle is 4.2 nm is calculated. Then, the composition when the palladium atoms of the surface, which correspond to one palladium layer, are all substituted with platinum atoms is calculated. In this case, the platinum present on the surface of the catalyst for fuel cells is 9.47%, and the palladium present thereon is 10.1%. The palladium amount relating to the remainder (excluding the platinum (90.5%)) is as follows: 10.1/90.5=11.2%.

In actual, however, as shown in Table 1, the platinum present on the surface of the catalyst for fuel cells of Reference Example 1 is 6.58%, and the palladium present thereon is 13.9%. In Reference Example 1, the palladium amount relating to the remainder (excluding the platinum (93.4%)) is as follows: 13.9/93.4=14.9%. This value is closer to the value relating to the carbon-supported palladium particles (raw material) (15.9%), rather than the value in the above palladium-eluted model (11.2%). That is, it is clear that in the production method of Reference Example 1, the palladium amount contained in the raw material is almost maintained.

Accordingly, in the method for immersing the palladium particles in the platinum compound solution, it is clear that no substitution reaction occurs between the palladium and the platinum, and the platinum is deposited on the palladium surface.

Next, Reference Example 2 will be discussed. From the ICP measurement results shown in Table 1, as for the catalyst for fuel cells of Reference Example 2, it is clear that the platinum present on the palladium particle surface is 6.40%, and the palladium present thereon is 13.8%. From this result, the platinum ratio x on the palladium particle surface is calculated as follows: x=6.40/(6.40+13.8)=32%. Therefore, it is clear that the platinum amount in Reference Example 2 is an amount that is not sufficient to cover the palladium particle surface with one platinum layer. Also, the coverage calculated from the ICP measurement results is 61%.

According to a comparison between the ICP measurement results of Reference Examples 1 and 2, there is almost no difference in the platinum and palladium ratio on the palladium particle surface and also in the coverage. From this result, in the method for obtaining the palladium particles by immersing the palladium particles in the platinum compound solution, it is clear that there is no significant change in the composition of the palladium particle surface even if the added platinum amount is increased from St=1.0 (Reference Example 2) to St=1.2 (Reference Example 1); the composition of the palladium particle surface is insensitive to the added platinum amount; and the platinum amount that can be directly deposited on the palladium particle surface has been already determined.

Finally, the results of Reference Example 1 and Comparative Example 1 will be compared. According to Table 1, the initial mass activity of Reference Example 1 is 1.3 times higher than that of Comparative Example 1, and the initial specific activity of Reference Example 1 is 1.2 times higher than that of Comparative Example 1. Also, after the potential cycles, the mass activity of Reference Example 1 is 1.3 times higher than that of Comparative Example 1, and the specific activity of Reference Example 1 is 1.1 times higher than that of Comparative Example 1. As shown in FIG. 7, there is almost no difference in the platinum ratio on the palladium particle surface between Comparative Example 1 and Reference Example 1; however, the mass activity and specific activity are higher in Reference Example 1. This fact indicates that Reference Example is better in the platinum-covered state than Comparative Example 1, that is, while the palladium particle surface is covered with the platinum monatomic layer in Reference Example 1, two or more atomic layers of platinum are deposited on the palladium particle surface in Comparative Example 1.

Also, according to Table 1, the change rate (decrease rate) of the electrochemical surface area in Reference Example 1 only accounts for 39% of the change rate (decrease rate) of the electrochemical surface area in Comparative Example 1. Considering that Reference Example Land Comparative Example 1 are substantially equal in the platinum ratio, this result indicates that the platinum is more widely distributed on the palladium particle surface in Reference Example 1 than in Comparative Example 1, and the part where the palladium particle surface is exposed is smaller in Reference Example 1 than in Comparative Example 1, so that Reference Example 1 is higher in durability.

REFERENCE SIGNS LIST

1. Palladium-containing particle
2. Platinum atoms
3. Copper atoms
3a. Copper atoms deposited on edges or corners of the palladium-containing particle surface
3b. Copper atoms deposited on terraces of the palladium-containing particle surface
11. Polyelectrolyte membrane
12. Cathode catalyst layer
13. Anode catalyst layer
14, 15. Gas diffusion layer
16. Cathode electrode
17. Anode electrode
18. Membrane electrode assembly
19, 20. Separator
21, 22. Gas channel
100a. Typical example of a first composite body
100b. Typical example of a second composite body
100c. Typical example of a fine catalyst particle
200. Unit cell of a fuel cell
300. Composite body in which copper atoms are deposited on the surface of a palladium particle

The invention claimed is:
1. A method for producing a fine catalyst particle comprising a palladium-containing particle and a platinum outermost layer covering the palladium-containing particle,
wherein a first composite body containing palladium and platinum is formed by mixing the palladium-containing particle with a first solution in which a platinum compound is dissolved, and, as a result of bringing the palladium-containing particle into direct contact with the first solution, then covering at least part of a surface of the palladium-containing particle with platinum;
wherein a second composite body containing palladium, platinum and copper is formed by mixing the first composite body with a second solution in which a copper compound is dissolved, and then covering at least part of a surface of the first composite body with copper using copper underpotential deposition;
wherein the copper in the second composite body is substituted with platinum derived from a third solution in which a platinum compound is dissolved, by mixing the second composite body with the third solution; and
wherein an amount of platinum atoms contained in the first solution is 70 atm % or less, when a minimum amount of platinum atoms required to cover the palladium-containing particle with a monatomic layer of platinum is 100 atm %.

2. The method for producing the fine catalyst particle according to claim 1, wherein the palladium-containing particle is supported on a carrier.

3. The method for producing the fine catalyst particle according to claim 1, wherein the palladium-containing particle is subjected to an acid treatment in advance, before the first composite body is formed.

4. The method for producing the fine catalyst particle according to claim 2, wherein the palladium-containing particle is subjected to an acid treatment in advance, before the first composite body is formed.

* * * * *